(12) United States Patent
Piwonka et al.

(10) Patent No.: US 7,010,423 B2
(45) Date of Patent: Mar. 7, 2006

(54) METHOD FOR OPERATING AN INTERNAL COMBUSTION ENGINE

(75) Inventors: Fridolin Piwonka, Tamm (DE); Benedikt Feldmann, Schwieberdingen (DE); Thomas Lenzing, Benningen (DE); Lutz Mueller, Aichtal (DE); Wolfgang Grimm, Allison Park, PA (US); Markus Klausner, Gerlingen (DE); Reinhold Pfotzer, Piossasco (IT); Wolfgang Becker, Langenlebarn (AT)

(73) Assignee: Robert Bosch GmbH, Stuttgart (DE)

( * ) Notice: Subject to any disclaimer, the term of this patent is extended or adjusted under 35 U.S.C. 154(b) by 40 days.

(21) Appl. No.: 10/500,100

(22) PCT Filed: Dec. 12, 2002

(86) PCT No.: PCT/DE02/04546

§ 371 (c)(1),
(2), (4) Date: Dec. 27, 2004

(87) PCT Pub. No.: WO03/056161

PCT Pub. Date: Jul. 10, 2003

(65) Prior Publication Data
US 2005/0096835 A1    May 5, 2005

(30) Foreign Application Priority Data
Dec. 27, 2001 (DE) ............... 101 63 751

(51) Int. Cl.
*F02D 41/18* (2006.01)
*G01F 1/68* (2006.01)

(52) U.S. Cl. ............. 701/115; 73/118.2; 73/204.26

(58) Field of Classification Search ........... 701/115, 701/102, 103; 73/117.3, 118.2, 204.26, 204.27
See application file for complete search history.

(56) References Cited

U.S. PATENT DOCUMENTS

| | | | | |
|---|---|---|---|---|
| 4,571,990 A | * | 2/1986 | Honig | 73/118.2 |
| 5,143,031 A | * | 9/1992 | Bruestle | 123/90.16 |
| 5,241,857 A | | 9/1993 | Schnaibel et al. | 73/118.2 |
| 5,515,714 A | | 5/1996 | Sultan et al. | 73/25.01 |
| 5,635,635 A | | 6/1997 | Tsukada et al. | 73/118.2 |
| 6,494,090 B1 | * | 12/2002 | Losing et al. | 73/204.26 |

FOREIGN PATENT DOCUMENTS

| | | |
|---|---|---|
| DE | 39 35 778 | 10/1990 |
| DE | 196 36 097 | 3/1997 |

(Continued)

OTHER PUBLICATIONS

* Patent Abstracts of Japan, vol. 010, No. 207 (M-500), Jul. 19, 1986 (JP 61 049144, Mar. 11, 1986).

(Continued)

*Primary Examiner*—Hieu T. Vo
(74) *Attorney, Agent, or Firm*—Kenyon & Kenyon

(57) ABSTRACT

A method and a control unit for operating an internal combustion engine of a motor vehicle are provided, in particular for controlling/regulating the internal combustion engine as a function of an air-mass sensor signal from a first air-mass sensor. A first auxiliary signal, which is obtained arithmetically from an additional sensory system or from models of the internal combustion engine, allows a plausibility control or the substitution of the air-mass sensor signal in the case of signal interference of the air-mass sensor signal, and thereby ensures that the internal combustion engine is able to continue working in the optimal operating point.

32 Claims, 6 Drawing Sheets

FOREIGN PATENT DOCUMENTS

| | | |
|---|---|---|
| DE | 197 50 496 | 5/1999 |
| DE | 198 58 656 | 7/1999 |
| DE | 199 33 665 | 1/2001 |
| DE | 100 63 752 | 6/2002 |
| EP | 1 087 213 | 3/2001 |
| EP | 1 229 238 | 8/2002 |

OTHER PUBLICATIONS

* Bosch, R: "Volumendurchfluss QV—V. A Und Massen Durchfluss QM = V. A", Air Flow Sensor With Temperature Sensor, Massen Durchflussmesser, XX, XX, pp. 117-118. XP002132294.

* cited by examiner

METHOD FOR OPERATING AN INTERNAL COMBUSTION ENGINE

FIELD OF THE INVENTION

The present invention relates to a control unit and a method for operating an internal combustion engine of a motor vehicle, such that the internal combustion engine is controlled/regulated as a function of an air-mass sensor signal.

BACKGROUND INFORMATION

If a fault occurs in the air-mass sensor signal of the air-mass sensor, known operating methods have the disadvantage that the control/regulation of the internal combustion engine is influenced in such a way that the internal combustion engine will no longer operate at the optimal operating point.

When driving on a wet surface, for instance, spray water may get into an intake tract of the internal combustion engine, where it can penetrate an air filter and wet an air-mass sensor installed in the intake tract. This effect, which is also known as water entry, is particularly disadvantageous for the widely used hot-film air-mass sensors, which have a heating surface that cools when brought into contact with water in the liquid phase, with the result that the air-mass sensor signal generated by the air-mass sensor is distorted.

Using the distorted air-mass sensor signal, the control unit controlling/regulating the internal combustion engine calculates an incorrect value for the air-fuel ratio to be set, so that the internal combustion engine no longer operates at the optimal operating point.

Furthermore, the emission values of the internal combustion engine are affected by water entry, since a portion of the introduced water or the water vapor generated therefrom reaches a combustion chamber of the internal combustion engine, where it displaces a portion of the air quantity required for combustion.

Accordingly, it is an object of the present invention to provide a method for operating an internal combustion engine that minimizes the influence of an interference variable, which affects the air-mass sensor signal, and in turn effects the regulation of the internal combustion engine.

SUMMARY

In accordance with the present invention, at least one first auxiliary signal is utilized, and the influence of an interference variable, which affects the air-mass sensor signal, and in turn effects the regulation of the internal combustion engine, is reduced as a function of the first auxiliary signal.

The inclusion of the first auxiliary signal according to the present invention makes it possible for the internal combustion engine to operate at the optimal operating point despite a fault in the air-mass sensor signal. Compared to conventional operating methods for internal combustion engines, an optimal power output of the internal combustion engine is ensured even when driving on wet surfaces, and compliance with legally mandated limit values for emissions of the internal combustion engine is ensured as well.

An advantageous example embodiment of the operating method according to the present invention includes a comparison of the first auxiliary signal, or a signal derived from the first auxiliary signal, with the air-mass sensor signal, or a signal derived from the air-mass sensor signal, and a comparison result is obtained.

Comparing the first auxiliary signal with the air-mass sensor signal makes it possible to determine a fault of the air-mass sensor in the case of substantially different signal characteristics. In this manner, wetting of the heating surface of a hot-film air-mass sensor with water, for instance, is able to be detected. It is also possible to detect other types of faults of the air-mass sensor, for instance a signal cut-off of the sensor caused by mechanical damage to a signal line.

A direct comparison of a signal derived from the first auxiliary signal with the air-mass sensor signal or with a signal derived from the air-mass sensor signal is particularly advantageous. This makes it possible to include only certain signal components of the first auxiliary signal in the comparison.

Another example embodiment of the operating method according to the present invention includes obtaining a controlled variable for the control of the internal combustion engine as a function of the comparison result. The use of this controlled variable allows the control/regulation of the internal combustion engine to be adapted in such a way that a compensation of the influence of the disturbance variable on the air-mass sensor signal may take place.

In a variant of the method, the controlled variable may be obtained from the difference of a first auxiliary variable, interpreted as setpoint value for the air mass flowing into the intake tract, and the air-mass sensor signal.

In a further variant of this method, it is additionally possible to obtain the controlled variable from the first auxiliary signal alone; this is useful when the air-mass sensor signal deviates significantly from an expected value. When the air-mass sensor is not available at all, the method according to the present invention will still allow the internal combustion engine to be operated at the optimal operating point.

Another advantageous example embodiment of the operating method according to the present invention includes obtaining the first auxiliary signal from state variables of the internal combustion engine, so that no additional external sensors are necessary to obtain the first auxiliary signal. Instead, the first auxiliary signal may be ascertained from the position of a driver pedal, the rotational speed, the temperature, as well as other state variables of the internal combustion engine.

Another advantageous example embodiment of the present invention includes obtaining the first auxiliary signal from a signal of an exhaust-gas probe such as a lambda probe. In this embodiment, it is possible to subject the air-mass sensor signal to a plausibility check since, with knowledge of the injected fuel quantity, the fuel mass actually conveyed to the combustion chamber may be calculated from the signal of the exhaust-gas probe. In contrast to the air-mass sensor signal, the signal of the exhaust-gas analyzer probe is not greatly distorted by the water vapor in the combustion chamber.

If the first auxiliary signal deviates significantly from the air-mass value obtained from the air-mass sensor signal, a malfunction of the first air-mass sensor may be concluded, possibly due to water in the intake tract. In this case, the operating method according to the present invention makes it possible to, e.g., discard the faulty air-mass sensor signal and substitute the first auxiliary signal as input variable for the control device of the internal combustion engine.

To consider the generally higher dynamics of a hot-film air-mass sensor compared to a lambda probe, the measured values of the air-mass sensor signal may be averaged. As an alternative, it is possible to connect a filter downstream from the air-mass sensor, which describes the dynamics of the controlled system of the lambda probe. If the internal combustion engine is a diesel gasoline engine, a lean-mixture sensor may be used as exhaust-gas probe.

A permanent comparison of the air-mass sensor signal with the signal from the exhaust-gas probe may take place within the framework of the afore-described plausibility control of the air-mass sensor signal, the controlled variable for regulating/controlling the internal combustion engine being obtained as a function of the comparison result.

In accordance with advantageous example embodiment of the operating method according to the present invention, the comparison includes the following steps: differentiating the air-mass sensor signal so as to obtain a differentiated air-mass sensor signal; differentiating the first auxiliary signal to obtain a differentiated auxiliary signal; and forming the difference from the differentiated air-mass sensor signal and the differentiated auxiliary signal to obtain a differential signal, the differential signal being a measure for the difference in the time change between the signal from the first air-mass sensor and the first auxiliary signal. The first auxiliary signal may be obtained from the state variables of the internal combustion engine or from the signal of an exhaust-gas probe and may be interpreted as setpoint value for the air mass.

If the differential signal exceeds a predefinable threshold value, which corresponds to a dynamic response of the air-mass sensor signal that deviates significantly from the first auxiliary signal, a malfunction or a fault of the air-mass sensor is detected in this example embodiment. It is advantageous for simple processing of the differential signal if the differentiated air-mass sensor signal is scaled to a time average of the air-mass sensor signal, the differentiated auxiliary signal is scaled to a time average of the first auxiliary signal, and the absolute value of the differential signal is generated so as to obtain a positive differential signal. Finally, the differential signal is compared to at least one predefinable threshold value. If the afore-mentioned absolute-value generation is omitted, two threshold values for the differential signal must be selected accordingly.

The threshold value makes it possible to specify the maximum value or the extremal values of the differential signal at which a difference between the air-mass sensor signal and the first auxiliary signal is not yet interpreted as fault of the air-mass sensor signal.

In the case of a single threshold value and in the event that it is exceeded, the first auxiliary signal is obtained as controlled variable. The air-mass sensor signal is obtained as controlled variable if the comparison result indicates that the differential signal is smaller than or equal to the threshold value. An analogous procedure is proposed in the case of two threshold values.

In a further advantageous example embodiment of the operating method according to the present invention, the first auxiliary signal is obtained from a signal of a second air-mass sensor. The additional, second air-mass sensor, just like the exhaust-gas probe, allows a plausibility control of the air-mass sensor signal from the first air-mass sensor.

Another advantageous example embodiment of the present invention provides that the first auxiliary signal be obtained from a signal of an already present rain sensor of the motor vehicle. Rain sensors are used to control windshield wipers, for example, and the signals they provide may be utilized as a measure for the precipitation quantity. From the precipitation quantity, which is correlated to the interference variable influencing the air-mass sensor signal, namely the water quantity striking the heating surface of the hot-film air-mass sensor, the controlled variable may be ascertained.

Another example embodiment of the present invention provides that the first auxiliary signal is obtained from a signal of a capacitive sensor, the capacitive sensor being configured as integral component of the first air-mass sensor. A variant having an especially small design results from the fact that the surface of the already present first air-mass sensor is used as first capacitor plate of the capacitive sensor. A second capacitor plate of the capacitive sensor may be arranged in a housing of the first air-mass sensor, for example.

Another advantageous example embodiment of the present invention provides that the first auxiliary signal is obtained from a signal of an ohmic sensor, the ohmic sensor being configured as integral component of the first air-mass sensor. An advantageous example embodiment of the method according to the present invention provides that the ohmic sensor has at least two electrodes preferably made of a corrosion-resistant material. This ensures that the ohmic sensor is also suited for long-term operation.

A further example embodiment of the present invention provides for the ohmic sensor to be arranged on the surface of the first air-mass sensor.

In an advantageous further embodiment of the operating method according to the present invention, the first auxiliary signal is obtained from the signal of the capacitive sensor and the signal of the ohmic sensor. Water droplets striking the surface of the air-mass sensor are able to be detected in a reliable manner by changes in the capacitance or the conductivity of the respective sensor. If a hot-film air-mass sensor is used, an arrangement of the capacitive/ohmic sensor directly on the heating surface may be used.

Within the framework of the comparison, an advantageous example embodiment of the method according to the present invention provides for a difference to be formed from the first auxiliary signal and the air-mass sensor signal so as to obtain the controlled variable. The first auxiliary signal may be determined from the state variables of the internal combustion engine, such as the driver-pedal position, the rotational speed and additional variables. The first auxiliary signal in this case represents a setpoint value for the air mass to be conveyed to the internal combustion engine, the setpoint value being obtained from the state variables of the internal combustion engine. This allows a comparison with the air-mass signal actually detected by the air-mass sensor.

A filtering of the air-mass sensor signal prior to forming the difference is advantageous for obtaining a filtered air-mass sensor signal. In this way, only the signal frequencies of the air-mass sensor signal that are meaningful for the comparison are considered in the comparison. For example, when a low pass filter is used for filtering, high frequency signal components of the air-mass sensor signal are filtered out and will not be entered in the difference generation.

It is known that such high frequency signal components of the air-mass sensor signal are produced by water droplets hitting the heating surface of the air-mass sensor and by the related spontaneous cooling of the heating surface.

These high frequency signal components may be considered an interference variable since they do not contain any directly analyzable information about the air mass entering via the intake tract and have an interfering effect on the difference formation and thus on the controlled variable as well. This is prevented by using a low pass filter according to the present invention. It is useful in this context to select the cut-off frequency of the low pass filter such that the low pass filter filters out the highest possible portion of the signal energy of the high frequency signal components so as to minimize the influence of the interference variable.

To this end, an example embodiment of the method according to the present invention provides that the cut-off frequency of the low pass filter be selected dynamically and as a function of state variables of the internal combustion engine. This allows an especially good suppression of the interference variable via the low pass filter. Furthermore, additional interfering signal components of the air-mass sensor signal whose spectrum depends on the operating state of the internal combustion engine may be suppressed in this manner.

An additional example embodiment of the operating method according to the present invention provides that the cut-off frequency of the low pass filter is selected as a function of a model of the internal combustion engine. A so-called system model of the internal combustion engine may be used as model, which provides information regarding the spectrum of allowed air-mass sensor signals in the respective state of the internal combustion engine as a function of the state variables of the internal combustion engine.

Using this information, the cut-off frequency of the low pass filter is able to be selected in such a way that only spectral components of the air-mass sensor signal that are not caused by an interference effect are entered in the difference formation.

A further example embodiment of the method according to the present invention provides that the first auxiliary signal is obtained from the air-mass sensor signal by filtering with a high pass filter and is used as a controlled variable to control the internal combustion engine.

As already mentioned, it is known that water droplets striking the heating surface of a hot-film air-mass sensor cause high frequency signal components, which are able to be separated from the low frequency signal components of the air-mass sensor signal by the high pass filter utilized according to the present invention. In this case the first auxiliary signal is a measure for the water quantity striking the air-mass sensor and may be used as controlled variable.

In this embodiment as well, the selection of the cut-off frequency of the high pass is implemented dynamically and as a function of state variables of the internal combustion engine in order to increase the accuracy of the method, thereby preventing the possibility that the first auxiliary signal also contains signal components of a useful signal of the air-mass sensor.

Another example embodiment of the method according to the present invention provides a second auxiliary signal being obtained from the air-mass sensor signal via filtering with a low pass filter, and the controlled variable being obtained from the first auxiliary signal, the second auxiliary signal and state variables of the internal combustion engine. In this example embodiment, the first auxiliary signal constitutes a measure for the water quantity striking the air-mass sensor; the second auxiliary signal constitutes the actual useful signal of the air-mass sensor representing the air mass flowing through the intake tract; and from the state variables of the internal combustion engine it is possible in turn to dynamically select a cut-off frequency of the low pass/high pass filter.

It is conceivable that the cut-off frequency of the low pass filter corresponds to the cut-off frequency of the high pass filter. To obtain a spectral separation of the first and the second auxiliary signal, a band stop may be utilized instead of the low pass filter and the high pass filter, the band stop's lower cut-off frequency matching the cut-off frequency of the low pass filter and its upper cut-off frequency matching the cut-off frequency of the high pass filter.

According to a further advantageous example embodiment of the present invention, the cut-off frequency of the high pass/low pass filter is selected as a function of a model of the internal combustion engine. As an alternative, it is also possible for the upper and the lower cut-off frequency of the band stop to be selected as a function of a model of the internal combustion engine.

Another advantageous example embodiment of the present invention provides two air-mass sensors arranged in an intake manifold of the internal combustion engine in such a way that air flowing into the intake manifold first reaches the first air-mass sensor and then the second air-mass sensor, which is located at a distance in the flow direction of the aspirated air, and the method includes the following steps within the framework of the comparison: delaying the air-mass sensor signal by a delay time so as to obtain a delayed air-mass sensor signal; subtracting the first auxiliary signal from the delayed air-mass sensor signal in order to obtain a differential signal; integrating the differential signal so as to obtain an indicator signal; differentiating the delayed air-mass sensor signal to obtain a differentiated air-mass sensor signal; forming the amount of the differentiated air-mass sensor signal to obtain a positive air-mass sensor signal; differentiating the first auxiliary signal to obtain a differentiated auxiliary signal; forming the amount of the differentiated auxiliary signal to obtain a positive auxiliary signal; and subtracting the positive auxiliary signal from the positive air-mass sensor signal to obtain an additional differentiated signal.

The indicator signal obtained from the differentiated signal is a measure for the water quantity present in the intake manifold or in the intake tract; the operational sign of the additional differentiated signal indicates which one of the two air-mass sensors provides the greater signal change. According to the present invention, when a predefinable threshold value for the indicator signal is exceeded, i.e., in the case of water entry into the intake tract, the controlled variable is obtained from the indicator signal and the signal of the particular air-mass sensor for which the smaller signal change has been detected. This mechanism takes the fact into account that high-frequency signal components in the air-mass sensor signal are in all likelihood caused by water droplets striking the heating surface of an air-mass sensor, or originate from other interference effects and not from usually low-frequency changes in the air-mass flow through the intake tract that are appropriate to the operation.

Another advantageous example embodiment of the method according to the present invention provides that both air-mass sensors are arranged next to one another, that the delay step is omitted, and that the second air-mass sensor is provided with a water-droplet separator. In another example method according to the present invention, it is advantageous that a model simulating the dynamic response of the water-droplet separator is taken into account in the processing of the air-mass sensor signal and/or the first auxiliary signal. The model makes it possible to consider the dynamic response of the second air-mass sensor, which is changed because of the water-droplet separator, thereby ensuring the comparability of the sensor signals from the first air-mass sensor and the second air-mass sensor.

Another example embodiment of the method according to the present invention provides both air-mass sensors being integrated in a shared sensor system, e.g., in a shared housing.

Another advantageous example embodiment of the method according to the present invention provides that the first air-mass sensor is designed as hot-film air-mass sensor.

The implementation of the method according to the present invention may be in the form of a computer program which is provided for a control unit of an internal combustion engine in a motor vehicle. The computer program has program codes suitable for carrying out the method according to the present invention when it is executed on a computer. Furthermore, the program code may be stored on a computer-readable data carrier, such as a flash memory. In these cases, the present invention is thus realized by the computer program.

DETAILED DESCRIPTION

Figure 1:
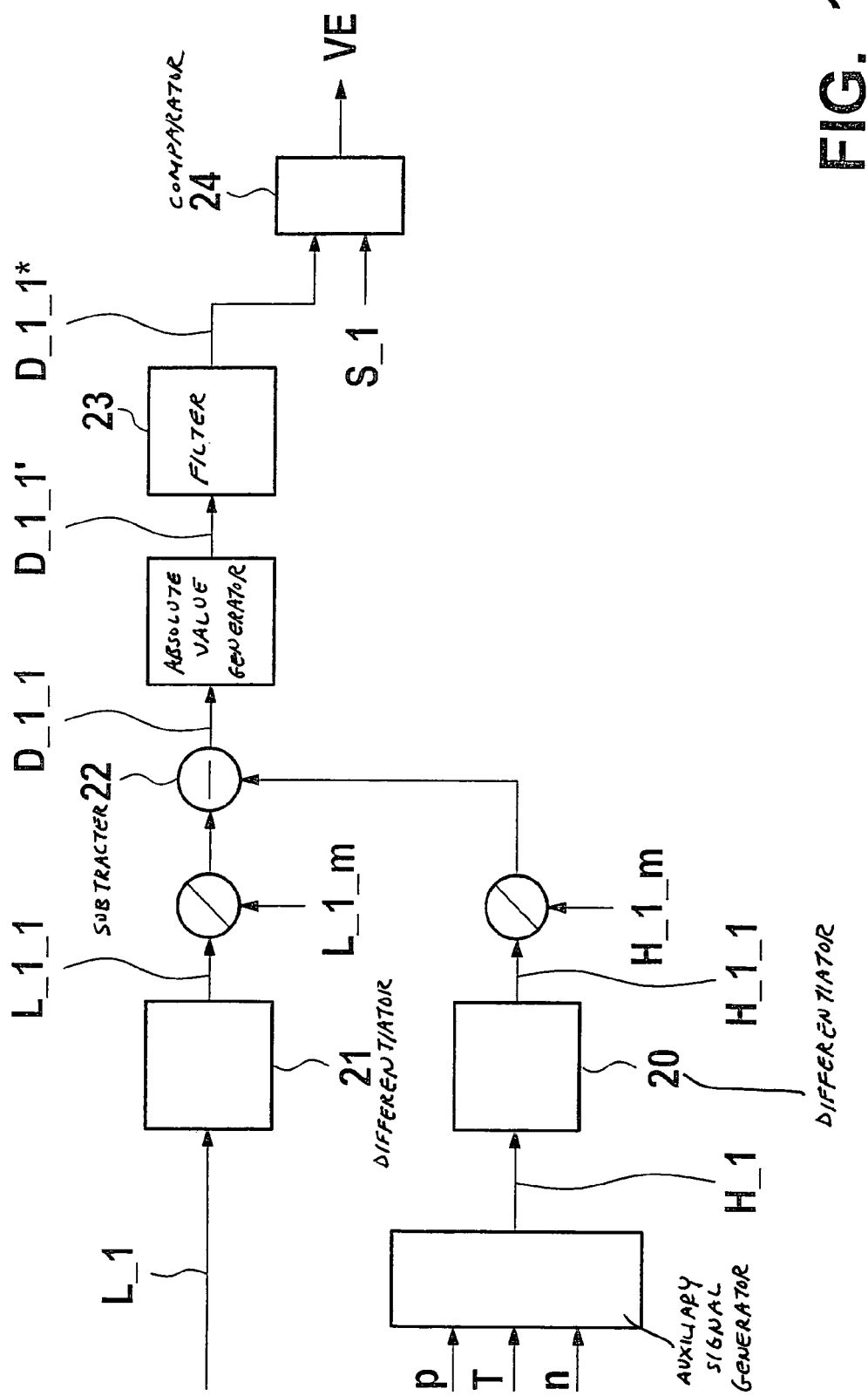
FIG. 1 is a schematic illustration of signal flow according to a first example embodiment of the method according to the present invention.

FIG. 1 shows a signal flow of a first example method according to the present invention, in which a first auxiliary signal H_1 and an air-mass sensor signal L_1 from a first hot-film air-mass sensor HFM_1 (FIG. 5) are analyzed. Air-mass sensor HFM_1 is arranged in intake tract 3 of an internal combustion engine 1 (FIG. 5), and emits a signal L_1 whose value is proportional to the air mass flowing through the intake tract.

The evaluation of signals L_1, H_1 makes it possible to reduce the influence of an interference variable, which affects air-mass sensor signal L_1, and in turn effects the control/regulation of internal combustion engine 1 implemented by control unit 2. The time sequence of the method steps for the evaluation may be seen from the flow chart of FIG. 1a.

As can be seen in FIG. 1, auxiliary signal H_1 is obtained from the following state variables of internal combustion engine 1: pressure P of the fresh air outside intake tract 3; temperature T of the fresh air; and the rotational speed n of internal combustion engine 1; additional state variables (not shown) of internal combustion engine 1 may also be used, as well. Auxiliary signal H_1 indicates the air mass determined from state variables P, T, n with the aid of the general gas equation, the air mass being the air mass required by internal combustion engine 1 during the operation with state variables P, T, n.

Figure 1A:
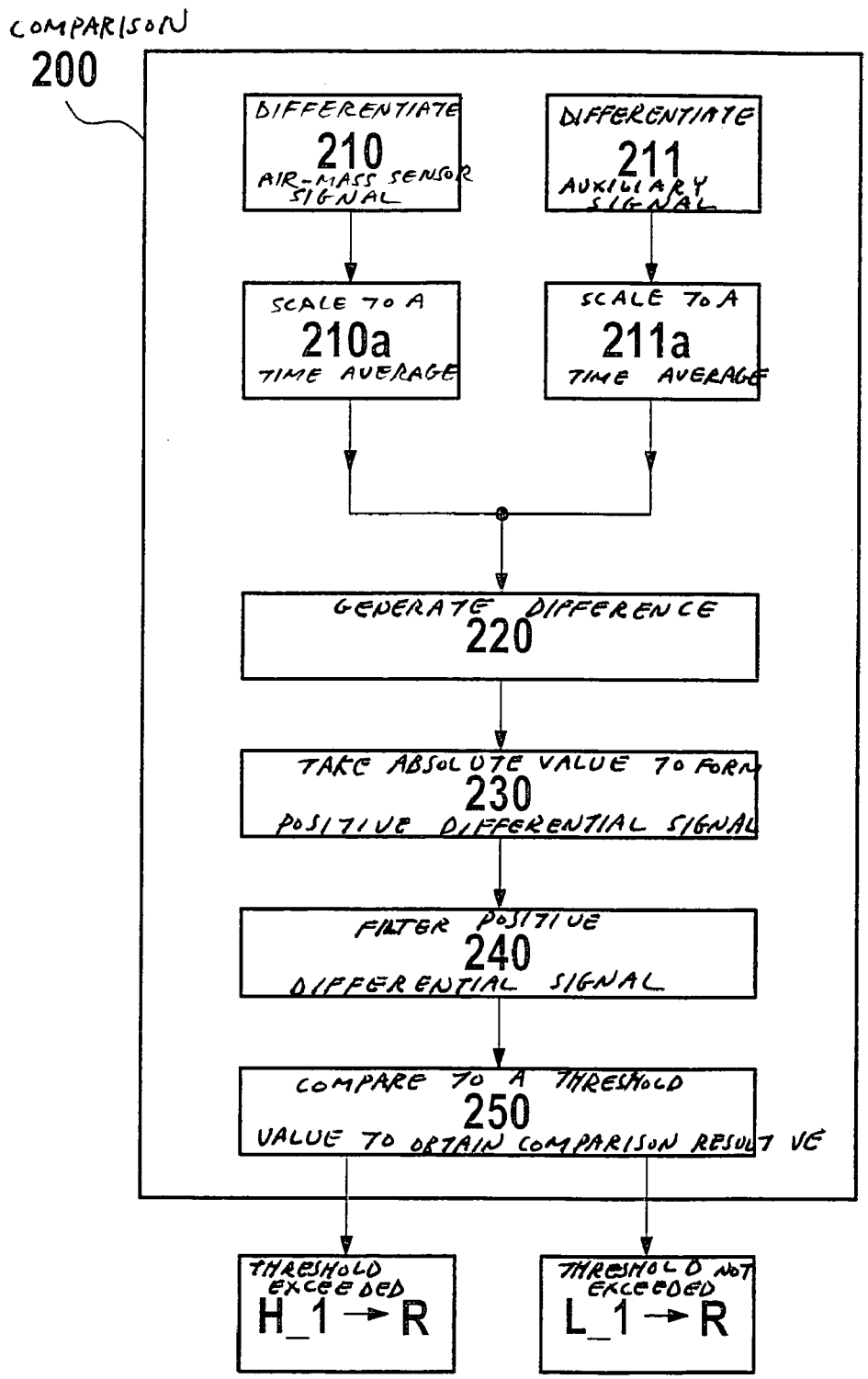
FIG. 1a is a flow chart corresponding to the signal flow shown in FIG. 1.

First auxiliary signal H_1 is conveyed to differentiator 20, which, in step 211 of the flow chart of FIG. 1a, forms a differentiated auxiliary signal H_1_1 from first auxiliary signal H_1.

Next, in step 211a of FIG. 1a, differentiated auxiliary signal H_1_1 is scaled to a time average H__1_m of first auxiliary signal H_1.

In parallel with steps 211, 211a, air-mass sensor signal L_1 of first air-mass sensor HFM_1 (FIG. 5) is transmitted to a further differentiator 21 (FIG. 1), which takes place in step 210 of FIG. 1a. Differentiator 21 of FIG. 1 delivers a differentiated air-mass sensor signal L_1_1, which, in a following step 210a (FIG. 1a), is scaled to a time average L_1_m of air-mass sensor signal L_1.

The difference generation from differentiated air-mass sensor signal L_1_1 and differentiated auxiliary signal H_1_1 in substracter 22 (FIG. 1), which follows in step 220, yields a differential signal D_1_1. Finally, in step 230, the amount of differential signal D_1_1 is formed so as to obtain a positive differential signal D_1_1', which is filtered by a filter 23 in following step 240.

Filtered differential signal D_1_1* is compared in a comparator 24 with a predefinable threshold value S_1 in order to obtain a comparison result VE. The comparison of filtered differential signal D_1_1* with predefinable threshold value S_1 takes place in step 250 of FIG. 1a.

Two possible comparison results VE exist in comparison 250 with predefinable threshold value S_1 for filtered differential signal D_1_1*, which is always positive due to the amount generation in step 230.

Differential signal D_1_1 indicates the difference between the time change of air-mass sensor signal L_1 of first air-mass sensor HFM_1 and the time change of first auxiliary signal H_1. For as long as differential signal D_1_1 does not exceed a selected limit value, it is assumed that no interference influence of signal L_1 from air-mass sensor HFM_1 exists. In this case, signal L_1 is obtained as controlled variable R (FIG. 1a).

However, as soon as the limit value is exceeded, it is assumed that an interference influence of signal L_1 is present, which represents the cause of the deviating dynamic response of signals L_1, H_1. In this case, first auxiliary signal H_1 is obtained as controlled variable R, i.e., control unit 2 shown in FIG. 5 does not receive a signal L_1 from an external sensor as input variable for the air flowing through intake tract 3, but a variable that is calculated in control unit 2 itself.

The interference influence may stem from interferences resulting from high-frequency electromagnetic radiation in the area of connecting lines of air-mass sensor HFM_1. Another cause may be attributable to water droplets striking the heating surface of air-mass sensor HFM_1 and the spontaneous cooling of the heating surface that accompanies it.

The method according to the present invention prevents speed fluctuations or a sudden drop in the output of internal combustion engine 1, and also the exceeding of limit values for the emissions of internal combustion engine 1: this is due to the fact that in a malfunction of air-mass sensor signal L_1, auxiliary signal H_1 is substituted as controlled variable R or as input variable for control unit 2 of internal combustion engine 1.

Figure 2:
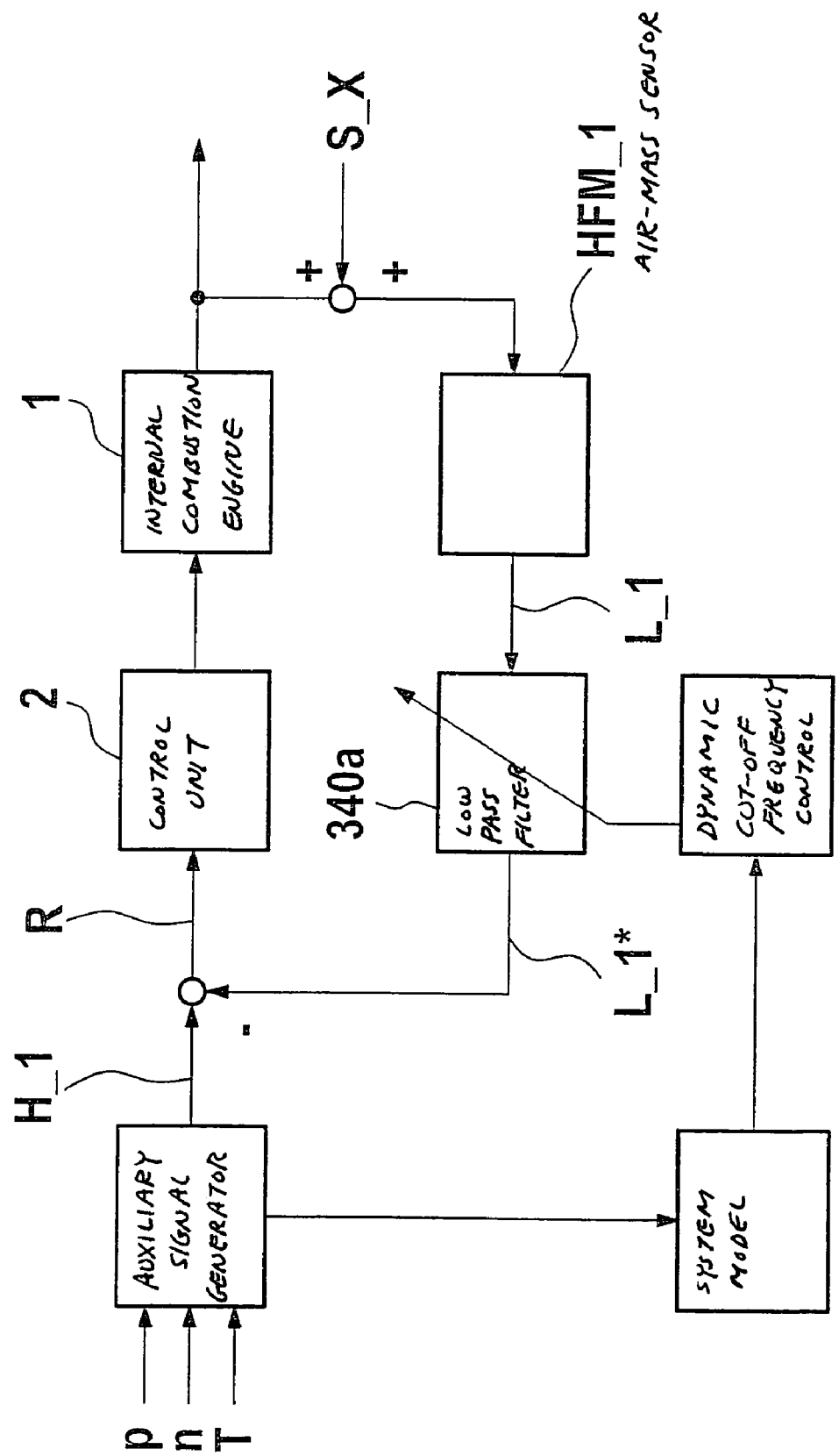
FIG. 2 is a schematic illustration of signal flow according to a second example embodiment of the present invention.

The signal flow of a second example embodiment of the present invention is shown in FIG. 2, which simultaneously represents a closed-loop control circuit of internal combustion engine 1. The associated method flow chart may be seen from FIG. 2a.

As can be seen from FIG. 2, air-mass sensor HFM_1 provides an air-mass sensor signal L_1, which is obtained from the value of the air mass in intake tract 3 of internal combustion engine 1 and an interference variable S_X that is superposed onto this value.

As already mentioned, interference variable S_X represents signal interferences of air-mass sensor signal L_1, which are caused, for instance, by water droplets striking the heating surface of air-mass sensor HFM_1.

Figure 2A:
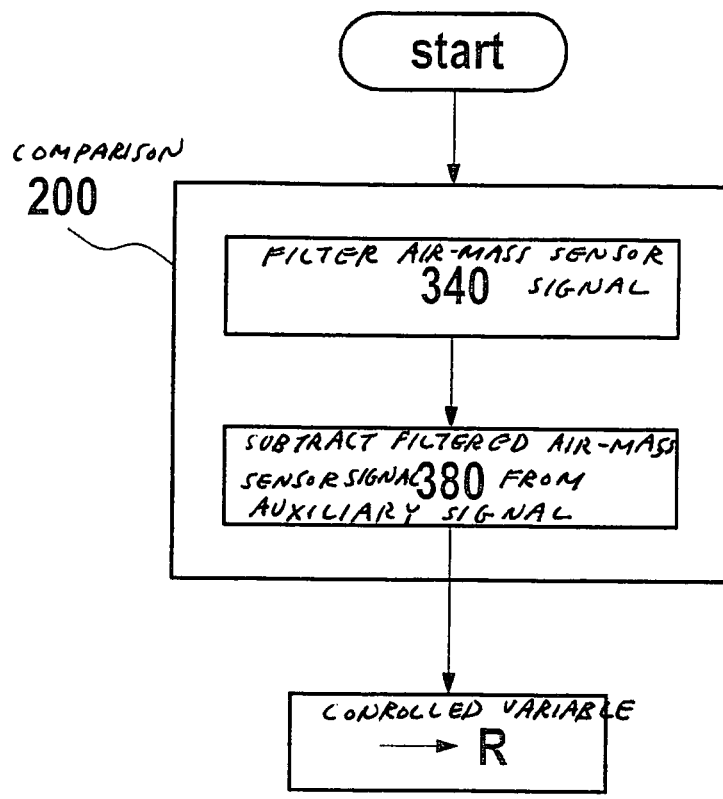
FIG. 2a is a flow chart corresponding to the signal flow shown in FIG. 2.

According to FIG. 2a, signal L_1 is first filtered by a low pass filter 340a in a step 340, which results in a filtered air-mass sensor signal L_1*. Filtered air-mass sensor signal L_1* is subsequently subtracted from an auxiliary signal H_1 in a step 380.

As in the previous example, auxiliary signal H_1 is arithmetically obtained from state variables P, T, n of internal combustion engine 1. Difference generation 380 provides controlled variable R, which is supplied as input variable to control unit 2 and influences the regulation of internal combustion engine 1.

Controlled variable R acts on a closed-loop control circuit for the exhaust-gas recirculation, for instance. This makes it possible to adjust the air-fuel mixture conveyed to internal combustion engine 1 to an optimal value.

In the ideal state, controlled variable R assumes the value zero, i.e., the air mass recorded by air-mass sensor HFM_1 is as large as the arithmetically determined air mass of auxiliary signal H_1. As soon as interference variable S_X assumes a value other than zero, for instance when water enters the intake tract, a non-zero value results for controlled variable R as well.

To prevent the interference variable S_X from influencing the regulation of the exhaust-gas recirculation, air-mass sensor signal L_1 is filtered by low pass filter 340a. On the basis that interference variable S_X usually provides high-frequency signal components compared to the air mass to be measured, in particular when water has entered intake tract 3, the cut-off frequency of low pass filter 340a is selected such that only low-frequency signal components of air-mass sensor signal L_1 are allowed to pass and are thus considered when determining controlled variable R. High frequency signal components attributable to the interference variable will not be allowed to pass by 340a and are thus unable to influence the formation of controlled variable R.

It is advantageous to select the cut-off frequency dynamically, i.e., during operation of internal combustion engine 1, that is to say, as a function of a so-called system model of internal combustion engine 1. The system model provides information concerning the spectrum of air-mass sensor signal L_1 as a function of state variables P, T, n.

This information also includes the highest signal frequency of signal L_1 to be expected. On the basis of this information it is possible to include in the generation of controlled variable R only that part of the spectrum of signal L_1 that indicates the actually recorded air mass.

Figure 3:
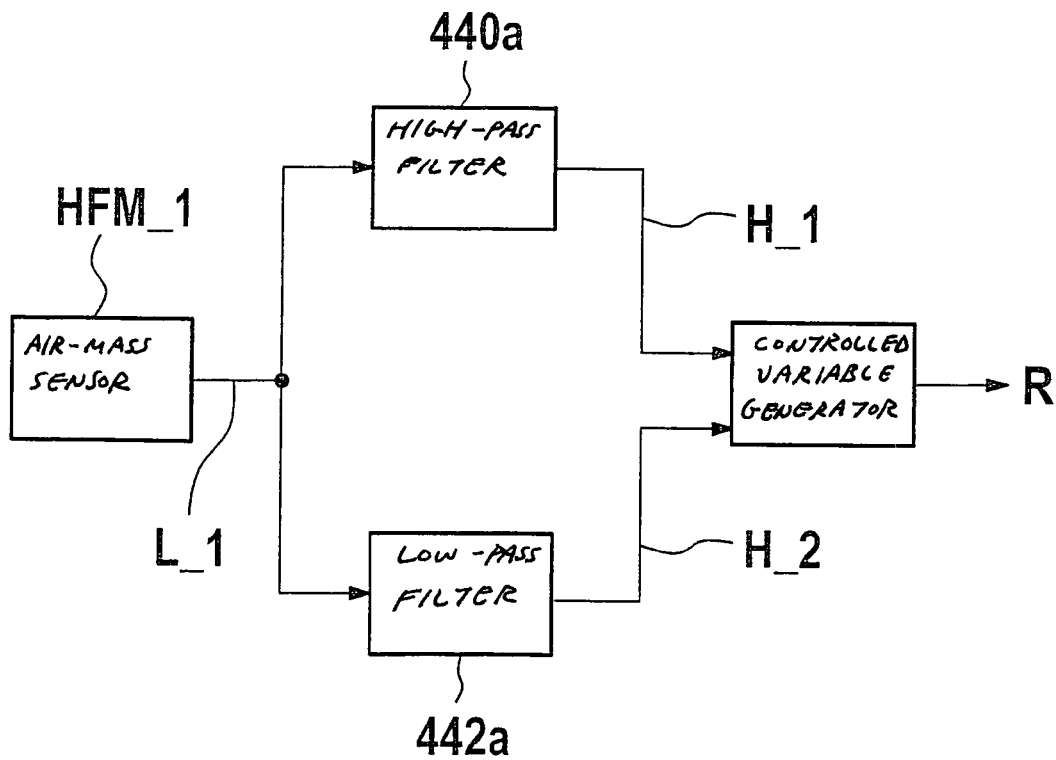
FIG. 3 is a schematic illustration of signal flow according to a third example embodiment of the method according to the present invention.

FIG. 3 shows the signal flow according to an example embodiment of the present invention, which includes both a high pass filter 440a and also a low pass filter 442a.

On the basis of air-mass sensor signal L_1 of air-mass sensor HFM_1, first auxiliary signal H_1 is obtained from high-pass filtering of signal L_1 using high-pass filter 440a. Second auxiliary signal H_2 is obtained from low-pass filtering of signal L_1 using low pass filter 442a.

Figure 5:
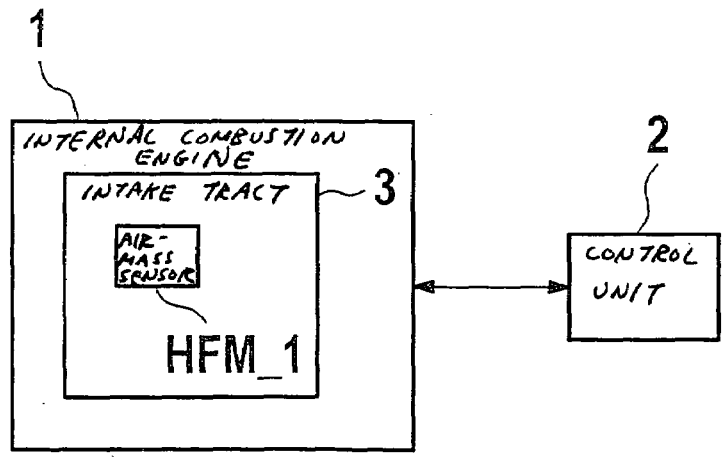
FIG. 5 shows a schematic illustration of an internal combustion engine according to the present invention.

Controlled variable R is obtained from the two auxiliary signals H_1, H_2, analogously to the previous examples, from state variables (not shown in FIG. 3) of internal combustion engine 1 (cf. FIG. 5).

In this embodiment, the water quantity in intake tract 3 of internal combustion engine 1 is represented by auxiliary signal H_1, which, due to the high-pass filtering, includes only the signal components stemming from the water droplets striking the heating surface of sensor HFM_1.

The low-frequency signal components of air-mass sensor signal L_1, which indicate the actual air-mass flow, form second auxiliary signal H_2.

The cut-off frequencies of filters 440a, 442a are selected as a function of a model of internal combustion engine 1 and are dynamically adapted to the individual operating state.

With knowledge of the water quantity in intake tract 3 from first auxiliary signal H_1, the actual air mass from second auxiliary signal H_2, and from state variables of internal combustion engine 1 (as well as possibly additional parameters of the combustion), it is possible to calculate the air mass actually available in the combustion chambers of internal combustion engine 1.

Even with water in its liquid phase present in intake tract 3 of internal combustion engine 1, it is possible to operate internal combustion engine 1 at the optimal operating point.

Figure 4:
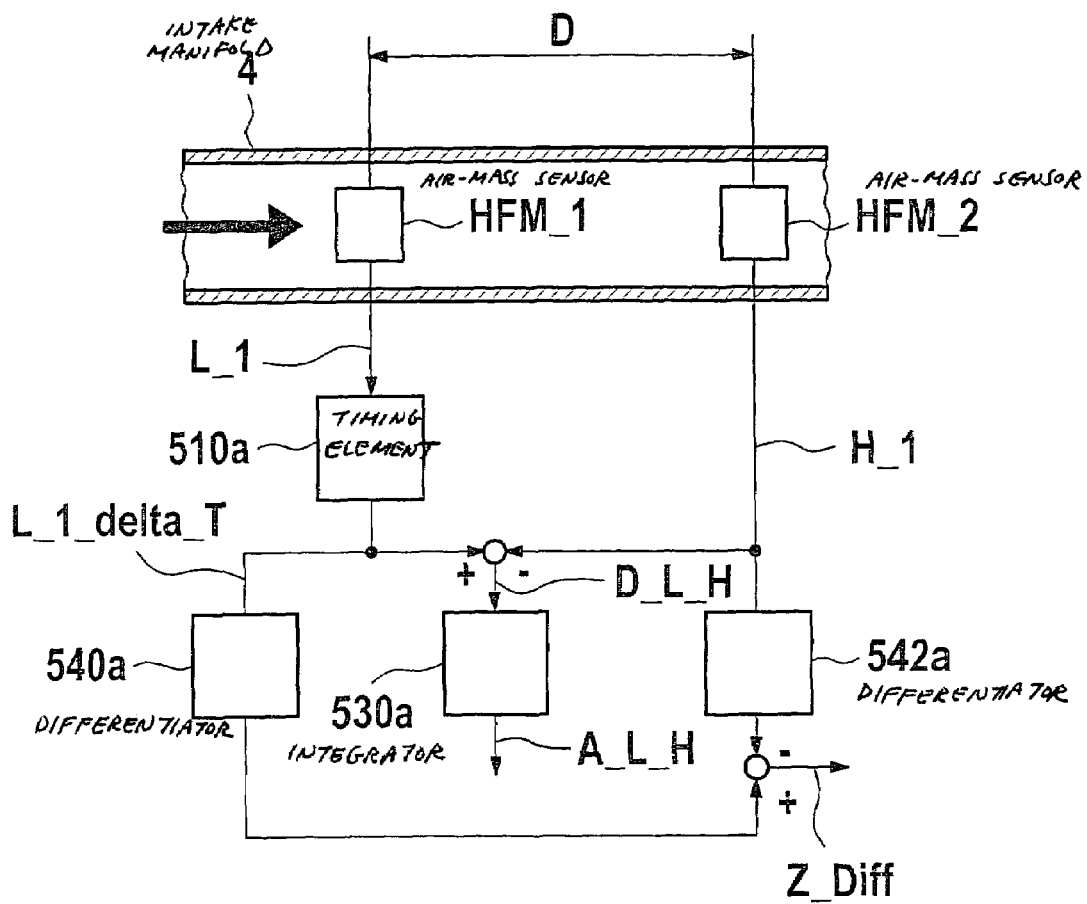
FIG. 4 is a schematic illustration of the arrangement of the hot-film air-mass sensors HFM_1, HFM_2 in intake manifold 4, as well as the associated signal flow.

Another example embodiment of the present invention is shown in FIG. 4. Two hot-film air-mass sensors HFM_1, HFM_2 are arranged in intake manifold 4 at a clearance D with respect to one another. The arrow indicates the flow direction of the air flowing into intake manifold 4.

As can be gathered from FIG. 4, first air-mass sensor HFM_1 is first surrounded by an inflowing air volume, and, following a propagation delay as a function of clearance D, second hot-film air-mass sensor HFM_2 is surrounded by the inflowing air volume as well.

Figure 4A:
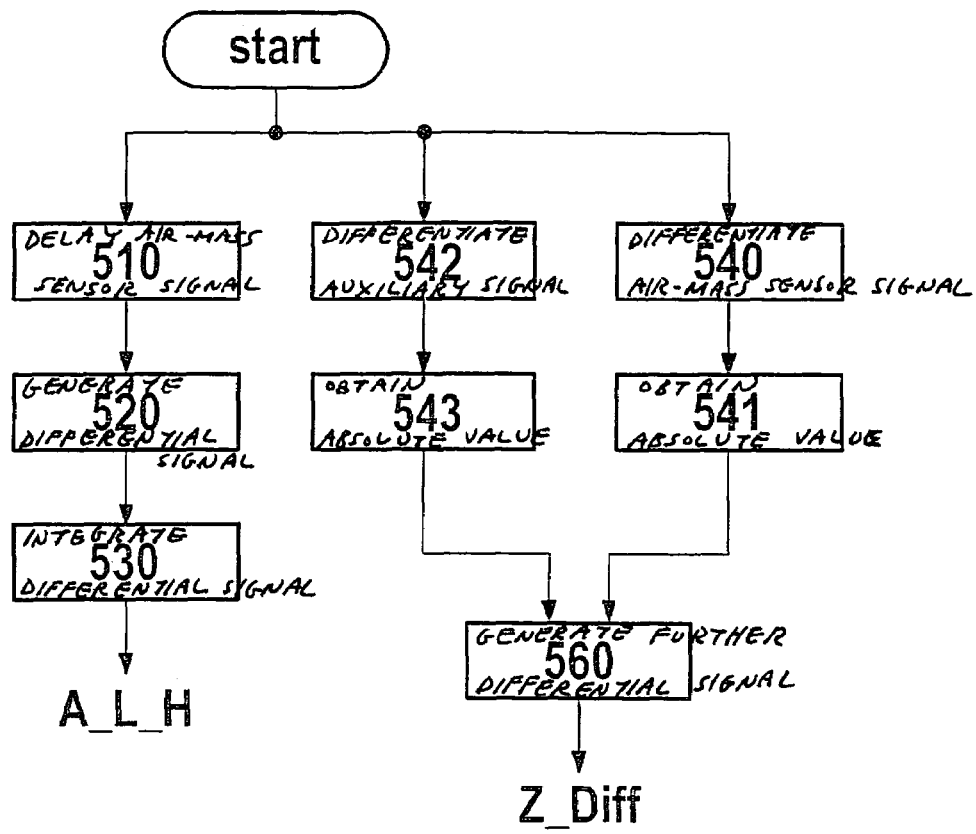
FIG. 4a is a flow chart of the third example embodiment of the method according to the present invention.

First sensor HFM_1 provides air-mass sensor signal L_1, and second sensor HFM_2 provides first auxiliary signal H_1. To compensate for the propagation-delay difference between air-mass sensor signal L_1 and first auxiliary signal H_1 caused by clearance D, timing element 510a is provided. It delays (cf. flow chart FIG. 4a) air-mass sensor signal L_1 by the time required by an air volume flowing into intake manifold 4 to travel from first sensor HFM_1 to second sensor HFM_2 and provides delayed air-mass sensor signal L_1_delta_T, which is subsequently differentiated in differentiator 540a so as to obtain a differentiated air-mass sensor signal L_1_delta_T_1. The delay time of timing element 510a is adjustable and is selected such that the difference from signals L_1_delta_T and H_1 is zero when no water is present in intake manifold 4.

First auxiliary signal H_1 provided by second sensor HFM_2 is differentiated in differentiator 542a to obtain a differentiated auxiliary signal H1_1. Both differentiators 540a, 542a also perform an amount generation, so that a positive air-mass sensor signal L_1_delta_T_1' and a positive auxiliary signal H1_1', respectively, are present at the individual outputs.

Finally, positive auxiliary signal H1_1' is subtracted from positive air-mass sensor signal L_1_delta_T_1' in order to obtain a further differential signal Z_Diff.

Furthermore, first auxiliary signal H_1 is subtracted from delayed air-mass sensor signal L_1_delta_T, and resulting differential signal D_L_H is integrated in integrator 530a so as to obtain an indicator signal A_L_H.

The indicator signal is a measure for the deviation of the signals measured by sensors HFM_1, HFM_2; from this deviation it is possible to determine the water quantity introduced in intake manifold 4. Differential signal Z_Diff indicates which one of the two sensors HFM_1, HFM_2 detects a greater signal change.

As soon as indicator signal A_L_H exceeds a predefinable threshold value, controlled variable R (not shown in FIG. 4) is obtained either from air-mass sensor signal L_1 or from first auxiliary signal H_1.

To obtain the most reliable value for the measured air mass for forming controlled variable R, the sensor signal whose signal change is smaller is used to form controlled variable R in this case.

If differential signal Z_Diff>O, the signal change of air-mass sensor signal L_1 is greater than the signal change of first auxiliary signal H_1; in this case, air-mass sensor signal L_1 is ignored and controlled variable R is generated from first auxiliary signal H_1. In an analogous manner, controlled variable R is formed from air-mass sensor signal L_1 in a negative differential signal Z_Diff.

With the aid of indicator signal A_L_H from which the introduced water quantity may be determined, and using the individual, not ignored sensor signal as a measure for the actual air quantity in intake tract 3, controlled variable R is able to be formed so as to calculate the correct fuel quantity to be injected as a function of the air mass actually available in the combustion chamber.

Both air-mass sensors HFM_1, HFM_2 may also be arranged next to one another in intake manifold 4, second air-mass sensor HFM_2 being provided with a water separator (not shown). Since the water separator modifies the dynamic response of second air-mass sensor HFM_2, a model of the dynamic response of the water-droplet separator is connected downstream from first air-mass sensor HFM_1 in order to ensure comparability of the two sensor signals.

In this embodiment, a deviation of the sensor signals of both air-mass sensors HFM_1, HFM_2 provides a measure for the water quantity that has entered intake manifold 4. Both air-mass sensors HFM_1, HFM_2 may be arranged in the same housing.

What is claimed is:

1. A control unit for controlling the operation of an internal combustion engine using a control unit, based on an air-mass sensor signal from a first air-mass sensor, comprising:
   an arrangement for comparing at least one of a first auxiliary signal and a signal derived from the first auxiliary signal to one of the air-mass sensor signal and a signal derived from the air-mass sensor signal to obtain a differential signal;
   an arrangement for obtaining a positive differential signal by forming an absolute value of the differential signal; and
   a filter element for obtaining a filtered differential signal by filtering the positive differential signal;
   wherein the air-mass sensor signal is used as a controlled variable if one of the positive differential signal and the filtered differential signal falls below a predefined threshold value, and wherein the first auxiliary signal is used as the controlled variable if one of the positive differential signal and the filtered differential signal exceeds the predefined threshold value.

2. A computer-readable medium for storing a plurality of computer-executable program codes for controlling the operation of an internal combustion engine based on an air-mass sensor signal from a first air-mass sensor, the plurality of computer-executable program codes performing:
   comparing at least one of a first auxiliary signal and a signal derived from the first auxiliary signal to one of the air-mass sensor signal and a signal derived from the air-mass sensor signal to obtain a differential signal;
   obtaining a positive differential signal by forming an absolute value of the differential signal; and
   obtaining a filtered differential signal by filtering the positive differential signal;
   wherein the air-mass sensor signal is used as a controlled variable if one of the positive differential signal and the filtered differential signal falls below a predefined threshold value, and wherein the first auxiliary signal is used as the controlled variable if one of the positive differential signal and the filtered differential signal exceeds the predefined threshold value.

3. A method for controlling the operation of an internal combustion engine using a control unit, based on an air-mass sensor signal from a first air-mass sensor, comprising:
   comparing at least one of a first auxiliary signal and a signal derived from the first auxiliary signal to one of the air-mass sensor signal and a signal derived from the air-mass sensor signal to obtain a differential signal;
   obtaining a positive differential signal by forming an absolute value of the differential signal; and
   obtaining a filtered differential signal by filtering the positive differential signal;
   wherein the air-mass sensor signal is used as a controlled variable if one of the positive differential signal and the filtered differential signal falls below a predefined threshold value, and wherein the first auxiliary signal is used as the controlled variable if one of the positive differential signal and the filtered differential signal exceeds the predefined threshold value.

4. The method according to claim 3, wherein the differential signal is formed by the following steps:
   differentiating the air-mass sensor signal and the first auxiliary signal to obtain a differentiated air-mass sensor signal and a differentiated auxiliary signal; and
   forming a difference between the differentiated air-mass sensor signal and the differentiated auxiliary signal to obtain the differential signal.

5. The method according to claim 4, further comprising:
   scaling the differentiated air-mass sensor signal to a time average of the air-mass sensor signal; and
   scaling the differentiated auxiliary signal to a time average of the first auxiliary signal.

6. The method according to claim 5, wherein the first air-mass sensor is configured as hot-film air-mass sensor.

7. The method according to claim 3, wherein the first auxiliary signal is obtained from at least one of the following:
   state variables of the internal combustion engine;
   system model of the internal combustion engine;
   signal from an exhaust-gas probe;
   a second air-mass sensor;
   a rain sensor;
   an ultrasound sensor;
   a hot-wire air-mass sensor;
   a capacitive sensor; and
   an ohmic sensor.

8. The method according to claim 7, wherein the first auxiliary signal is obtained from a signal of a capacitive sensor, the capacitive sensor being configured as a component of the first air-mass sensor.

9. The method according to claim 7, wherein the capacitive sensor is configured as a plate capacitor having a first and a second capacitor plate, the first capacitor plate being formed by a surface of the first air-mass sensor.

10. The method according to claim 7, wherein the ohmic sensor includes at least two electrodes made of a corrosion-resistant material.

11. The method according to claim 7, wherein the ohmic sensor is arranged on a surface of the first air-mass sensor.

12. The method according to claim 7, wherein:
the first and second air-mass sensors are arranged in an intake manifold of the internal combustion engine, air flowing into the intake manifold first reaching the first air-mass sensor and then reaching the second air-mass sensor, the second air-mass sensor being separated from the first air-mass sensor by a clearance in the flow direction of the air;
the comparison of at least one of the first auxiliary signal and a signal derived from the first auxiliary signal to one of the air-mass sensor signal and a signal derived from the air-mass sensor signal includes:
  delaying of the air-mass sensor signal by a delay time to obtain a delayed air-mass sensor signal;
  subtracting the first auxiliary signal from the delayed air-mass sensor signal to obtain a differential signal;
  integrating the differential signal to obtain an indicator signal;
  differentiating the delayed air-mass sensor signal to obtain a differentiated air-mass sensor signal;
  forming an absolute value of the differentiated air-mass sensor signal to obtain a positive air-mass sensor signal;
  differentiating the first auxiliary signal to obtain a differentiated auxiliary signal;
  forming an absolute value of the differentiated auxiliary signal to obtain a positive auxiliary signal; and
  subtracting the positive auxiliary signal from the positive air-mass sensor signal to obtain a further differential signal.

13. The method according to claim 12, further comprising:
comparing the indicator signal with a threshold value to determine whether the indicator signal exceeds the threshold value;
wherein the controlled variable is obtained based on the first auxiliary signal and the indicator signal if the differential signal is positive, and wherein the controlled variable is obtained based on the air-mass sensor signal and the indicator signal if the differential signal is negative.

14. The method according to claim 12, wherein the first and second air-mass sensors are arranged side-by-side, the delay time is substantially zero, and the second air-mass sensor is provided with a water-droplet separator.

15. The method according to claim 14, wherein a model simulating the dynamic response of the water-droplet separator is taken into account in processing at least one of the air-mass sensor signal and the first auxiliary signal.

16. The method according to claim 12, wherein the first and second air-mass sensors are integrated in a common sensor system.

17. The method according to claim 3, wherein a comparison result is obtained based on the comparison of at least one of the first auxiliary signal and the signal derived from the first auxiliary signal to one of the air-mass sensor signal and the signal derived from the air-mass sensor signal.

18. The method according to claim 17, wherein the controlled variable is determined based on the comparison result, and wherein the controlled variable is used for the control of the internal combustion engine.

19. The method according to claim 3, wherein the first auxiliary signal is compared to the air-mass sensor signal to obtain the controlled variable.

20. The method according to claim 19, wherein the air-mass sensor signal is filtered prior to being compared to the first auxiliary signal.

21. The method according to claim 20, wherein a low pass filter is used to filter the air-mass sensor signal.

22. The method according to claim 21, wherein the cut-off frequency of the low pass filter is selected dynamically and as a function of state variables of the internal combustion engine.

23. The method according to claim 22, wherein the cut-off frequency of the low pass filter is selected as a function of a model of the internal combustion engine.

24. The method according to claim 3, wherein the first auxiliary signal is obtained from the air-mass sensor signal by filtering the air-mass sensor signal with a high pass filter, and wherein the first auxiliary signal is used as the controlled variable to control the internal combustion engine.

25. The method according to claim 24, wherein the cut-off frequency of the high-pass filter is selected dynamically.

26. The method according to claim 25, wherein the cut-off frequency of the high-pass filter is selected as a function of state variables of the internal combustion engine.

27. The method according to claim 24, further comprising:
obtaining a second auxiliary signal by filtering the air-mass sensor signal with a low-pass filter;
wherein the controlled variable is obtained from the first auxiliary signal, the second auxiliary signal and state variables of the internal combustion engine.

28. The method according to claim 27, wherein the cut-off frequency of the low-pass filter is selected dynamically.

29. The method according to claim 28, wherein the cut-off frequency of the low-pass filter is selected as a function of state variables of the internal combustion engine.

30. The method according to claim 29, wherein the cut-off frequency of the low-pass filter is selected as a function of a model of the internal combustion engine.

31. The method according to claim 3, wherein, for controlling the operation of the internal combustion engine based on the air-mass sensor signal from the first air-mass sensor, the first auxiliary signal is utilized, and, as a function of the first auxiliary signal, the influence of an interference variable on the regulation of the internal combustion engine is reduced, the interference variable affecting the air-mass sensor signal.

32. The method according to claim 31, wherein the interference variable is derived from the first auxiliary signal, and the controlled variable is obtained as a function of the interference variable.

* * * * *